United States Patent [19]
Haim et al.

[11] Patent Number: 4,637,687
[45] Date of Patent: Jan. 20, 1987

[54] CASCADED, DUAL CELL TRANSFLECTIVE LIQUID CRYSTAL DISPLAY

[75] Inventors: Elias S. Haim, Windham, N.H.; Richard Albert, Seymour, Conn.

[73] Assignee: General Electric Company, Schenectady, N.Y.

[21] Appl. No.: 620,648

[22] Filed: Jun. 14, 1984

[51] Int. Cl.⁴ .............................................. G02F 1/13
[52] U.S. Cl. ...................................... 350/335; 350/349
[58] Field of Search ............................ 350/335, 339 R

[56] References Cited
U.S. PATENT DOCUMENTS 4,516,834  5/1985  Cascini ................................ 350/335
4,541,692  9/1985  Collins et al. ................... 350/339 R

*Primary Examiner*—John K. Corbin
*Assistant Examiner*—Richard F. Gallivan
*Attorney, Agent, or Firm*—I. David Blumenfeld

[57] ABSTRACT

The contrast ratio of a transflective liquid crystal display in the transmissive mode is improved by means of a cascaded, dual cell arrangement. By using cascaded cells, the light path and light absorption in the background portions of the light path is improved in the transmissive mode so that the contrast ratio in the transmissive mode can, if desired, be made equal to or better than the contrast ratio in the reflective mode.

6 Claims, 4 Drawing Figures

CASCADED, DUAL CELL TRANSFLECTIVE LIQUID CRYSTAL DISPLAY

BACKGROUND OF THE INVENTION

The present invention relates to liquid crystal displays nd more particularly to a dual cell, transflective liquid display in which the contrast ratio in the transmissive mode is at least equal to and possibly better than it is in the reflective mode.

Liquid crystal devices are widely used in a variety of display applications. One of the principal reasons for the popularity of liquid crystal displays is their small size and low power consumption. Liquid crystal cells of the guest-host variety are particularly popular because they do not require polarizers; they have color capabilities; and they are intrinsically brighter than those utilizing polarizers.

One of the most significant forms of guest-host liquid crystal cells utilizes a pleochroic guest dye which exhibits anisotropic optical behavior; i.e., it absorbs light along one axis (the long axis) and transmits light along the other axis. The liquid crystal host contains an optically active material for imparting a helical order to the liquid crystal molecules so that the dye molecules spontaneously align themselves with the helically ordered liquid crystal molecules. In the absence of an electric field, with the dye molecules aligned in a helical order, (i.e., with their long axes parallel to the cell electrodes) they absorb light. When an electric field is applied to any portion of the cell, the helically ordered liquid crystal molecules in that portion unwind, i.e., the molecules assume a homeotropic order (with the nematic directors of the molecules at right angles to the cell electrodes). The long or light absorbing axes of the dye molecules also assume a homeotropic order and are thus oriented to transmit light through the energized portions of the cell.

The cell contrast ratio, i.e., the contrast between the cell display elements and the unenergized cell background portions, is an important characteristic of any cell because the contrast ratio affects the overall visibility and appearance of the display.

Control of contrast ratio is of particular significance in transflective liquid crystal displays because the contrast ratio can vary in such cells depending on the operational mode. The term "transflective" liquid crystal device is used broadly to denote an arrangement in which a liquid crystal cell may be operated in a reflective mode, a transmissive mode, or simultaneously in both modes. In the reflective mode, light (whether ambient or from a specific source) enters the front of the cell, passes through the guest-host solution to a transflective element at the back of the cell which reflects 80-95% of the impinging light. The reflected light passes back through the solution to the front of the cell.

In the transmissive mode, on the other hand, light from a source at the rear of the cell illuminates the transflective element which passes a portion of that light through the liquid crystal guest-host solution to the front of the cell. In a single cell display operated in the transmissive mode, it can be seen that light passes through the solution only once, while it passes through twice in the reflective mode. Light absorption by the dye in the unenergized background portions, is therefore much lower in the transmissive mode and the contrast ratio decreases markedly in this mode.

It has been suggested that the effect of differing contrast ratios on the overall appearance of a single cell transflective display might overcome by increase the cell thickness or the dye concentration or both. The premise being that if this increases the contrast ratios sufficiently, the ratios, though not the same in both modes, are sufficiently high in both modes (viz, 100 to 1 in the reflective and 25 to 1 in the transmissive) to be adequate. It has been found, however, that this had a deleterious effect on the brightness of the cell in the reflective mode.

Applicant has found that the contrast ratio of a liquid crystal display in the backlighted or transmissive mode may be enhanced to maintain the contrast ratio at least equal to that in the reflective mode without any deleterious effect on brightness by providing a cascaded, dual cell arrangement.

The second cell is positioned behind the transflective element. The spacing and dye concentration of the two cells are preferably the same. The display elements in the second cell are aligned with those of the first cell; and the two cells are both energized simultaneously in the transmissive mode.

In the transmissive mode, light passes through both cells and the contrast ratios controlled so that they are at least equal in both modes. In this fashion, the front cell thickness and dye concentration can be such as to optimize brightness while enhancing the contrast ratio in the transmissive mode by adding the second cell.

SUMMARY OF THE INVENTION

It is, therefore, a principal objective of the instant invention to provide a liquid crystal display assembly with excellent contrast ratio in the transmissive as well as in the reflective and mode.

Another objective of the invention is to provide improved contrast ratios for liquid crystal devices of the transmissive type.

Yet another objective of the invention is to provide a transflective guest-host liquid crystal display which has at least the same contrast ratio when operated in the transmissive mode as it does in the reflective mode.

Still another objective of the invention is to provide a backlighted liquid crystal display which has better contrast ratio than that obtainable with existing liquid crystal devices of the backlighted type.

Other objectives and advantages of the invention will become apparent as the description thereof proceeds.

Various objectives and advantages of the invention are realized in a transflective liquid crystal display device in which a second, liquid crystal cell is positioned between the transflective element and the rear light source. The two cells are spatially aligned so that all display elements of the two cells coincide. The coinciding display elements are connected electrically so that they are energized simultaneously when the cells are operated in the transmissive mode. The light paths through the guest-host solution, and the absorption of light are such that there is no loss of contrast ratio in the transmissive mode.

BRIEF DESCRIPTION OF THE DRAWING FIGURES

The novel features which are believed to be characteristic of this invention are set forth in the appended claims. The invention itself, however, both as to its organization and mode of operation, together with further objectives and advantages thereof, may best be understood by reference to the following transcription taken in connection with the accompanying drawing in which:

DETAILED DESCRIPTION OF THE PREFERRED EMBODIMENTS

Figure 1:
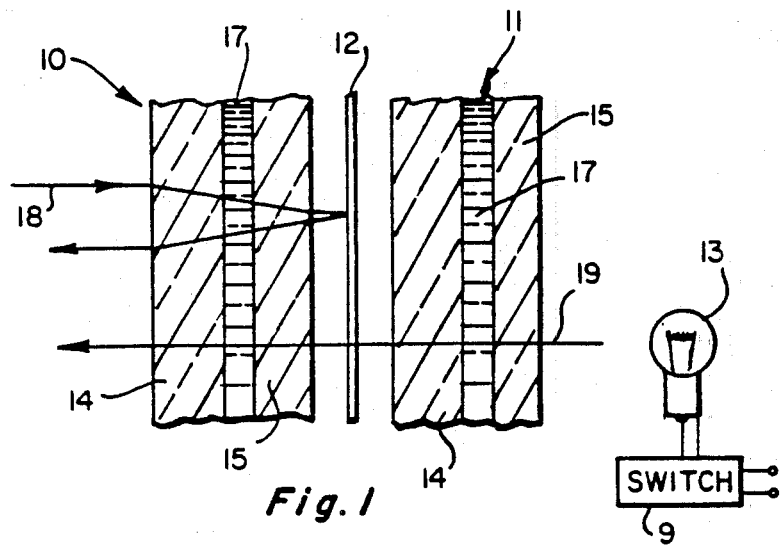
FIG. 1 is a schematic view of the cascaded dual LCD system and illustrates the light paths in both operational modes.

FIG. 1 shows two cascaded liquid crystal cells 10 and 11 separated by a transflective element 12 positioned between the rear of cell 10 and the front of cell 11. A light source 13 is positioned behind cell 11 and is energized from switch 9 when the cascaded dual cell assembly is operated in the transmissive mode.

The liquid crystal cells, which are shown schematically, each consist of a pair of optically transparent substrates 14 and 15 which are sealed by means of a plastic or glass frit seal, not shown, to form a chamber in which the liquid crystal guest-host solution 17 is retained. Optically transparent conductive electrodes, not shown, preferably in the form of indium-tin oxide, are deposited on the interior surfaces of the substrates of each cell in the shape of the display elements or indicia. These take the form of a variety of range marks, bars, bar sections, numerals, letters, etc. For example, the numerals may be of the well-known seven-segment type in which selective energization of the segments in various combinations is capable of producing numerals from zero to nine. The cells, as will be shown and described later in connection with the other figures, are arranged so that all the display elements coincide and are connected electrically by means of elastomeric connectors to energize corresponding display elements simultaneously.

The dual cell arrangement insures that the contrast ratio of the liquid crystal display is no worse in the transmissive mode than it is in the reflective mode. In the reflective mode, ambient light as shown by the arrow 18, enters the front of cell 10, passes through the liquid crystal solution, and is reflected by transflector 12 and passes back through the liquid crystal solution toward the viewer. Thus, the contrast ratio in the reflective mode is determined by degree of light absorption as the light passes through the unenergized background portions of the liquid crystal-dichroic solution twice. In a single cell display, light passes through the liquid crystal solution only once in the transmissive mode, whereas it passes through twice when the display is operated in the reflective mode. As a result, the contrast ratio of a single cell display is lower in the transmissive mode than it is in the reflective mode.

By providing a display with two cascaded cells, light from source 13, as shown by the arrow 19, passes through the solution in both and absorption of light in the unenergized portions of the cells is the same for both modes of operation. In fact, the rear cell may be so constructed (in terms of thickness, dye concentration, etc.) that the contrast ratio in the transmissive mode can be higher than it is in the reflective mode.

Figure 2:
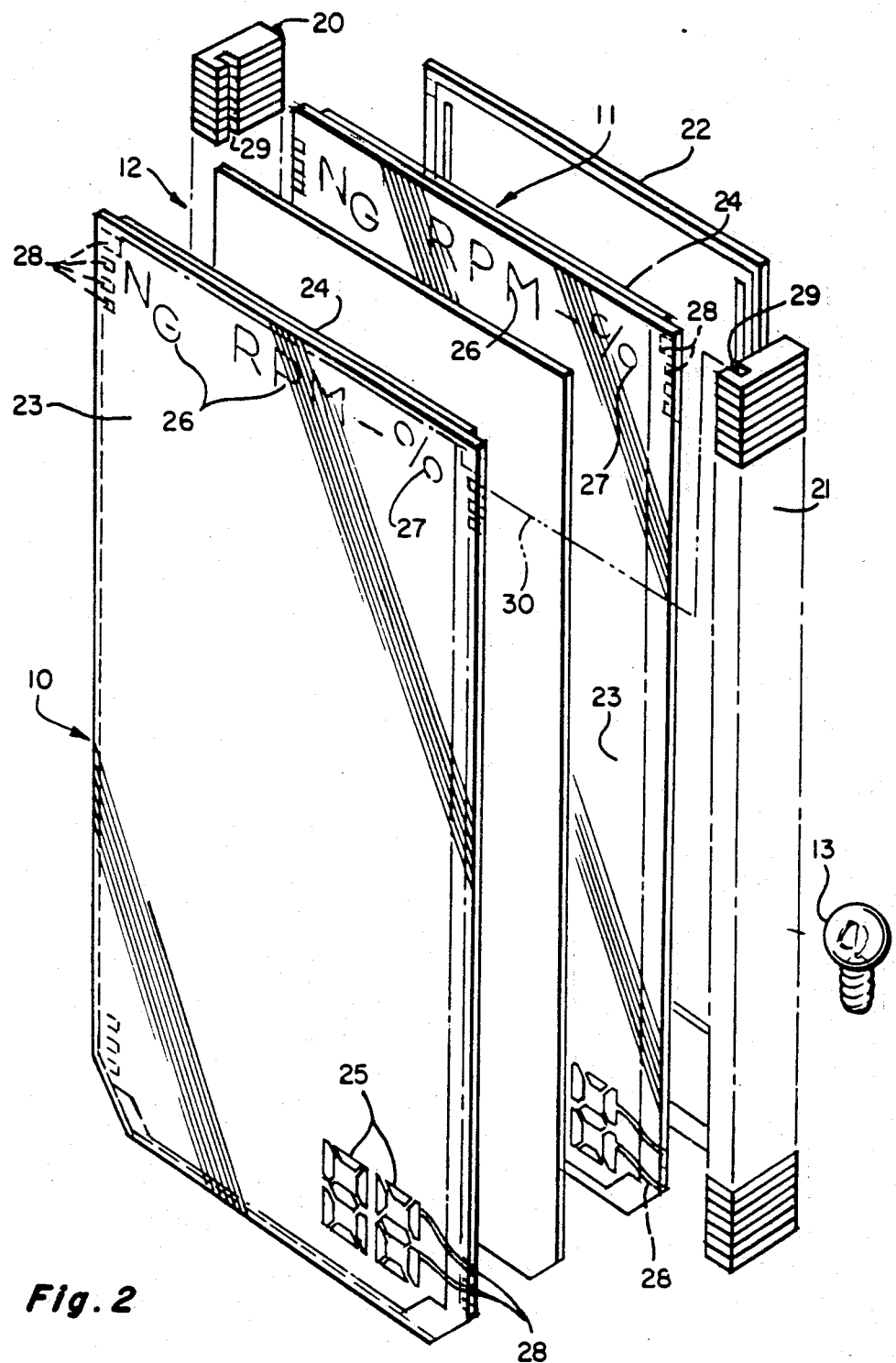
FIG. 2 is an exploded isometric view showing the manner in which display elements of the two cells are interconnected.

FIG. 2 is an exploded, isometric view of the cascaded cells.

The cascaded, dual cell display consists of cells 10 and 11, a transflective element 12 between the cells, and elastomeric connectors 20 and 21 positioned so as to energize the cells from a driver circuit board 22. Each cell consists of transparent glass front and rear plates 23 and 24 sealed around the edges to form an internal cavity which is filled with a solution consisting of a liquid crystal host material, an optically active ingredient, and a dichroic dye or combination of dichroic dyes. The rear plate of each cell is narrower than the front plate to facilitate contact between connectors 20 and 21, the conductive pads at the edges of the cell front plates and the power source.

As is conventional with liquid crystal display devices, the inner surface of the front plates of the two cells are coated with a conductive material such as indium-tin oxide in predetermined patterns to form the cell display elements. In one form the elements are seven element segmented characters such as those shown at 25 and other indicia or characters such as those shown at 26 and 27. The conductive layer on the inside surface of the back plate forms an electrical ground. Thus, when an electric field is established between any conductive segment on the front plate and the rear plate, the liquid crystal material between the electrodes change their alignment to transmit light. The size of the segments in the rear cell can be made larger than the segments in the front cell. This will benefit the system in two ways:

1. It will eliminate the need for tight tolerances for the alignment of the back cell to the front cell, and
2. since the back segment is larger, it will allow more light to reach the front segment, in the back lit mode, and thereby increase the brightness of the segment with reduced luminance.

The conductive electrodes forming the segmented characters 25 or the other elements 26 and 27 have conductive pads 28 which extend to the edge of the cell plates. Conductive pads 28 are connected through elastomeric connectors 21 and 22 to the driver circuits on Board 22 which selectively energize the display elements. Elastomeric connectors 21 and 22, as will be explained in greater details later in connection with FIG. 4, contain alternate layers of conductive and nonconductive material, with each conductive layer being connected between the driver board and a conductive pad on the front plate of each cell. Rear cell 11 is positioned in notches 29 of the elastomeric connectors so that the corresponding conductive pads 28 on both cells can be energized simultaneously. Dashed lines 30 in FIG. 2 illustrate the manner in which individual conductive layers of the elastomeric connector 21 contact the respective conductive pads 28 on both cells of the dual cell assembly.

Figure 3:
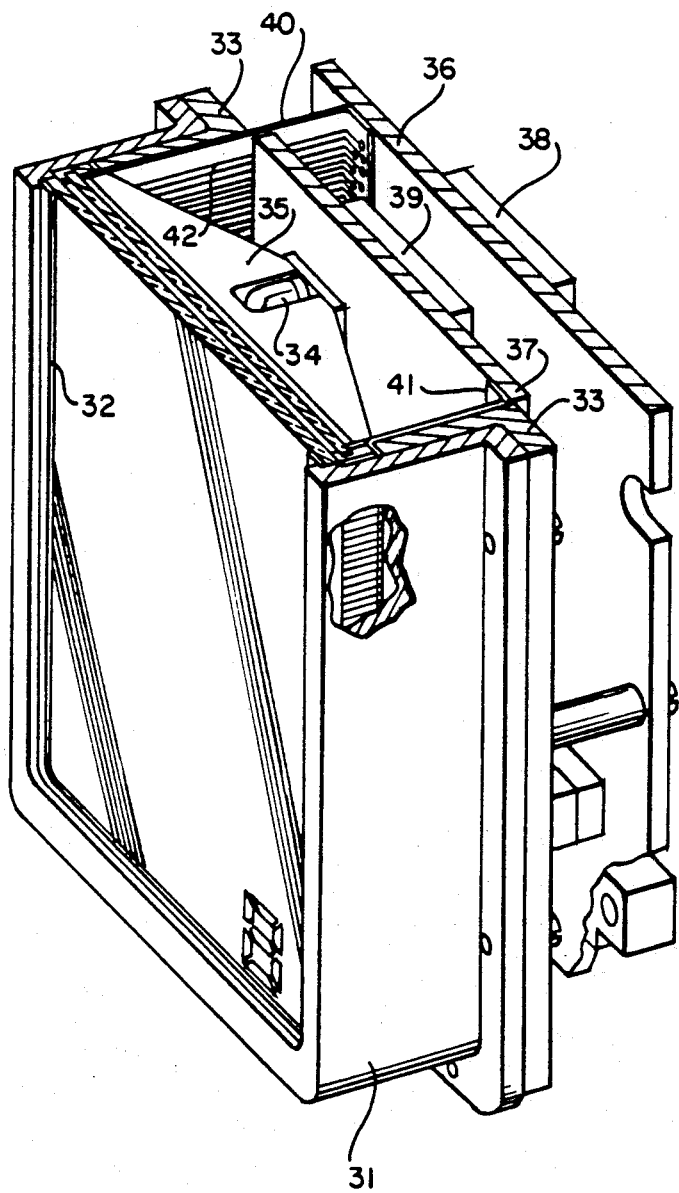
FIG. 3 is an isometric perspective of the assembled dual cell LCD assembly.

FIG. 3 shows an embodiment of the dual cell LCD in the assembled state with the cell holder partially broken away to show one of the elastomeric connectors. Thus, FIG. 3 shows a cell holder or bezel 31 which supports the cells and a transflective element. The cell assembly is secured by seal 32 and an L-shaped clamping element 33. A light source 34 mounted next to a diffuser 35 constitutes the illumination source at the rear of the cells during the transmissive mode. A pair of driver circuit boards 36 and 37 support the driver chips and other driver electronics 38 and 39. The driver circuits are attached to the clamp element 33 and holder 31 by means of the flex circuit support members 40 and 41. A plurality of L-shaped flex conductors 42 are mounted on the support members and connect the display driver circuits on boards 36 and 37 to the conductive layers of elastomeric connectors.

Figure 4:
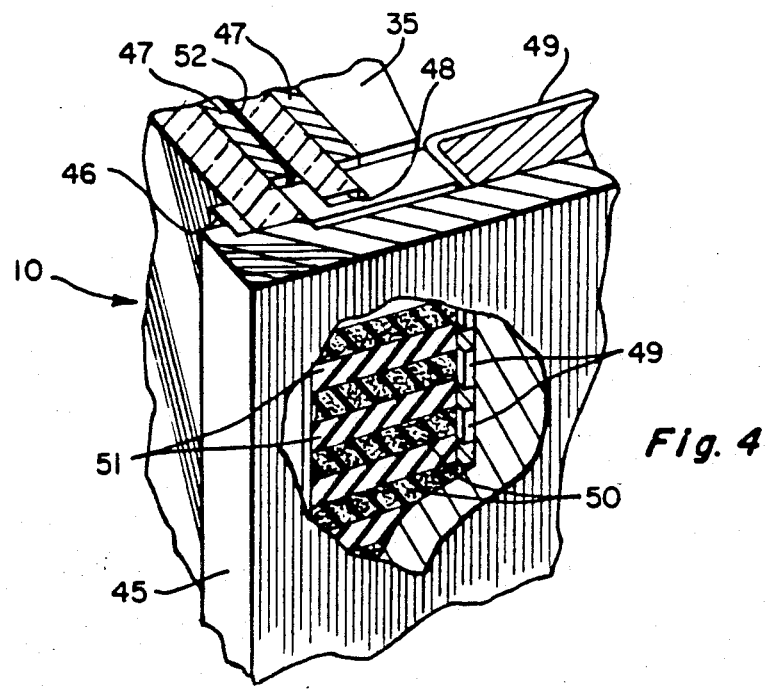
FIG. 4 is a partially broken away perspective of the elastomeric connector used to interconnect the coinciding display elements of the two cells.

FIG. 4 illustrates a broken away portion of cell housing or bezel 45. A seal 46 is positioned between the inner edge of housing 45 and the front of cell 10. The transparent rear plate 47 of each cell is narrower than the front plate so that the wider front plate and the conductive pads on these plates contact the ends of the elastomeric connector 47. Transflector 52 is positioned between the rear face of the front cell and the front face of the rear cell. The front plate of the rear cell extends into notch 48 in the elastomeric connector so that a conductive path is established between flex connectors 49 and the conductive pads, not shown at the edges of the front plates of both cells.

As shown in the broken away portion of FIG. 4, the elastomeric connector consists of alternate conductive and insulating layers 50 and 51. The conductive layers consist of carbon particles imbedded in a rubber matrix to provide a flexible conductive path. Elastomeric connectors of this type are commercially available through a variety of sources. One commercially available connector is sold by Hultronics Company of Hatbord, Pa. under its trade designation STAX CONNECTOR.

The host liquid crystal material in each of the cells may typically be a solution of biphenyl/pyrimedene of the type sold commercially by the Hoffman-LaRoche Company of Nutley, N.J., or by E M Chemicals of Hawthorne, N.J. Alternatively, compounds such as phenyl cyclohexanes, biphenyl cyclohexanes, cyanoesters, dioxanes or terphenyls may be used. The optically active material which causes the liquid crystal molecules to exhibit a helical order, with their optical or nematic director parallel to the substrate in the absence of electric field, may preferably be a cholesteric compound or alternately it may be a dopant which is an optically active biphenyl such as that sold by E. M. Merck Company under its trade designation CE-15. Cholesteral nonoates are alternative cholesteral-related compounds which act as an optically active material.

The dichroic dye or dyes which are incorporated as a guest in the liquid crystal host may be of any variety and are well known commercially. Thus dichroic dyes of various colors and chemical families (such as azo dyes, anthroquinones) are commercially available from sources such as E M Chemicals and Hoffman-LaRoche.

It can be seen from the previous description that a dual cascaded cell arrangement has been provided in which a contrast ratio of a liquid crystal cell in the transmissive mode assemblies is enhanced by means of an additional display located between the transflective element and the light source. The two cells are so aligned that all the display elements coincide and the coinciding elements are connected together electrically so that when the dual cell display assembly is energized in the transmissive mode, the contrast ratio in the transmissive mode is at least as high as it is in the reflective mode. This represents a very important improvement in transflective liquid crystal cell assembly since, in the past, the contrast ratio of single cell transflective assemblies was substantially worse in the transmissive mode.

While the instant invention has been shown in connection with certain preferred embodiments thereof, the invention is by no means limited thereto since other modifications of the instrumentality employed may be made and still fall within the scope of the invention. It is contemplated by the appended claims to cover any such modifications that fall within the true scope and spirit of this invention.

What we claim is new and desire to be secured by Letters Patent of the United States is:

1. A transflective liquid crystal display system comprising:
    a. A pair of liquid crystal cells of the guest-host variety, each including a liquid crystal host; an optically active material and one or more dichroic dyes for absorbing the light in the unenergized background portion,
    b. each of said cells having display elements of the same configuration which when energized permit passage of light, said cells being positioned to align all display elements and background portions on both cells,
    c. a transflective member positioned between said cells for reflecting light passing through the front cell, back through front cell in the reflective mode, and transmitting light through both the front and rear cells in the transmissive mode said rear cell having a greater spacing and thickness of solution than said front cell whereby light absorption therein and the contrast ratio of the assembly is greater in the transmissive mode than in the reflective mode,
    d. a light source positioned behind the rear cell and the transflective element and energized during the transmissive mode whereby the light path through the two cells in the transmissive mode is at least as high as the light path through one cell in the reflective mode to maintain the contrast ratio in both operational modes,
    e. means for simultaneously energizing both cells in the transmissive mode.

2. In a dual, cascaded liquid crystal display system, the combination comprising:
    a. a pair of dichroic dye guest-host liquid crystal cells separated by a transflective element for reflecting light entering the front cell and for transmitting light passing through the rear cell,
    b. a light source positioned behind said rear cell for use in the transmissive operational mode,
    c. said cells having display element of the same configuration, the display elements in said rear cell being larger than the corresponding elements in the front cell to increase the brightness of the segments in the transmissive mode whereby the light paths and light absorption for transmitted light is at least as high as it is in the reflected light mode,
    d. means for simultaneously energizing selected display elements of both cells in the transmissive mode whereby the contrast ratio for the display in the transmissive mode is at least high as it is in the reflective mode.

3. The liquid crystal display according to claim 2 wherein the means for simultaneously energizing both cells includes connector means coupled between a power source and corresponding ones of the display elements.

4. The liquid crystal display according to claim 3 wherein said connector contains a plurality of conductive elements for contacting connective pads associated with corresponding ones of the display elements.

5. The liquid crystal display according to claim 4 wherein said connector comprises a plurality of conductive layers separated by non-conductive layers.

6. The Liquid Crystal Display according to claim 1 wherein the dye concentration in said rear cell is greater than the concentration in the front cell to enhance the contrast ratio in the transmissive mode.

* * * * *